United States Patent
Ciesielski

(10) Patent No.: US 12,009,913 B2
(45) Date of Patent: Jun. 11, 2024

(54) MULTIPLEXER DEVICE FOR OBTAINING RESPECTIVE MEASUREMENT VALUES FROM A PLURALITY OF INPUT CHANNELS

(71) Applicant: B/E Aerospace, Inc., Winston Salem, NC (US)

(72) Inventor: Filip Ciesielski, Nieuwegein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 4 days.

(21) Appl. No.: 17/698,373

(22) Filed: Mar. 18, 2022

(65) Prior Publication Data

US 2022/0303033 A1   Sep. 22, 2022

(30) Foreign Application Priority Data

Mar. 18, 2021   (EP) ..................................... 21163545

(51) Int. Cl.
*H04J 3/02*   (2006.01)
*H04J 14/02*   (2006.01)

(52) U.S. Cl.
CPC .............. *H04J 3/02* (2013.01); *H04J 14/0227* (2013.01)

(58) Field of Classification Search
CPC .................................. H04J 3/02; H04J 13/16
See application file for complete search history.

(56) References Cited

U.S. PATENT DOCUMENTS

| | | | | |
|---|---|---|---|---|
| 5,222,065 A | * | 6/1993 | Krogmann | G06F 11/1487 714/E11.143 |
| 6,310,350 B1 | | 10/2001 | Silver et al. | |
| 6,336,593 B1 | | 1/2002 | Bhatnagar | |
| 6,688,119 B2 | * | 2/2004 | Holmes | G01R 27/2605 374/1 |
| 2005/0220136 A1 | * | 10/2005 | Shinomiya | H04J 14/0227 370/437 |
| 2008/0013947 A1 | * | 1/2008 | Peloso | H04Q 11/0062 398/5 |
| 2011/0043189 A1 | * | 2/2011 | Bauer | G01D 1/02 324/119 |
| 2011/0234300 A1 | | 9/2011 | Zhang et al. | |
| 2013/0063290 A1 | * | 3/2013 | Zou | H03M 1/1215 341/122 |

(Continued)

FOREIGN PATENT DOCUMENTS

| | | |
|---|---|---|
| DE | 2533382 B1 | 10/1976 |
| GB | 2541482 A | 2/2017 |

OTHER PUBLICATIONS

European Search Report for Application No. 21163545.3, dated Sep. 21, 2021, 7 pages.

*Primary Examiner* — Abdelnabi O Musa
(74) *Attorney, Agent, or Firm* — CANTOR COLBURN LLP

(57) ABSTRACT

A multiplexer device that is operable to generate from one or more input channels a multiplexed output signal. When generating the multiplexed output signal the multiplexing circuit is configured to encode the measurement values for the plurality of input channels from which input signals were provided to the multiplexer device into the multiplexed output signal in such a manner that respective measurement values from different ones of the plurality of input channels can be identified directly from the multiplexed output signal.

20 Claims, 4 Drawing Sheets

(56) References Cited

U.S. PATENT DOCUMENTS

| | | |
|---|---|---|
| 2014/0198820 A1 | 7/2014 | Sundstrom et al. |
| 2019/0332918 A1* | 10/2019 | Gómez Gutiérrez ........................ G05B 13/048 |
| 2019/0394735 A1* | 12/2019 | Osuna Ibarra ...... H04L 43/0823 |
| 2020/0049543 A1 | 2/2020 | Rieder et al. |
| 2022/0345525 A1* | 10/2022 | Rizzo Piazza Roncoroni ............. H04L 67/12 |

* cited by examiner

MULTIPLEXER DEVICE FOR OBTAINING RESPECTIVE MEASUREMENT VALUES FROM A PLURALITY OF INPUT CHANNELS

CROSS-REFERENCE TO RELATED APPLICATIONS

This application claims priority to European Patent Application No. 21163545.3 filed Mar. 18, 2021, the entire contents of which is incorporated herein by reference.

TECHNICAL FIELD

The present disclosure is generally concerned with measurement systems and methods of obtaining measurement values. In particular, the present disclosure relates to a multiplexer device that is operable to select between a plurality of input channels and to forward the selected input to an output channel (or output channels), and the use thereof to obtain respective measurement values from a plurality of input channels.

BACKGROUND

In many systems it is desired to monitor multiple operating conditions within the system, e.g., for diagnostic, control and/or prognostic purposes. To do this, a plurality of sensors may therefore be provided within the system for obtaining measurements of the operating conditions, and the measured data values can then be provided to control unit, e.g., that can act appropriately to control the system operation based on the measured data values.

An example of this might be, for instance, an oven system which is provided with a plurality of sensors for measuring various temperatures, etc., within the oven, which measured values are then provided to an oven control unit that can then adjust the heating power, or other operating conditions, accordingly, for example, to maintain a desired temperature. However, there is a wide range of other systems in which it may be desirable to measure data values from a plurality of sensors.

One approach for obtaining respective measurements from a plurality of sensors would be to provide the control unit with a separate, dedicated measurement channel for each sensor. In this way the control unit can read out the respective data value for any of the sensors, from the respective measurement channel, at any time. In some cases, it may be desirable to subsequently update or re-configure the measurement system, e.g., to be able to measure additional or different properties. In that case, where the measurement system includes a fixed and/or limited number of measurement channels, when it is desired to update or re-configure the system, significant hardware modifications may be required, e.g., to modify the control unit to add additional measurement channels.

Another approach for utilising the existing measurement channels would be to multiplex signals from multiple input channels. For instance, a multiplexer may be provided that is controlled to switch between different input channels upon request from an external control unit to provide one or more multiplexed output signal that contains a sequence of data values from the plurality of input channels. Again, in that case, because the input switching operation is controlled by an external control unit, where it is desired to update or reconfigure the measurement system, corresponding changes to the control unit hardware may also be required to facilitate this operation.

In many cases the control unit hardware can be modified as desired. However, in some applications, e.g., and especially, for systems that are intended to be used on board an aircraft, such as control units for aircraft galley inserts, there are strict regulatory/compliance requirements that need to be satisfied in order to validate any changes to the hardware before the system can be re-certified for use. This is particularly the case for changes to the control unit hardware as the control unit may need to perform various safety-critical functions.

This can therefore present a significant barrier to updating the measurement system since such certification process can typically take a number of months.

Thus, an aim of the present disclosure is to provide a measurement system that can be updated/re-configured more easily, e.g., and desirably, by reducing or eliminating the need to make significant hardware modifications to the control unit, thereby reducing the need for re-certification of the system prior to use.

SUMMARY

According to a first embodiment there is provided a method of obtaining measurement values from a plurality of input channels, the method comprising: receiving, at a multiplexer device, a plurality of input signals representing measurement values from a corresponding plurality of input channels; and the multiplexer device processing the input signals to generate a multiplexed output signal, wherein the multiplexed output signal includes a sequence of values representing respective measurement values for one or more of the input channels from which input signals were provided to the multiplexer device, wherein the multiplexer device when generating the multiplexed output signal encodes the measurement values for the plurality of input channels from which input signals were provided to the multiplexer device in such a manner that respective measurement values from different ones of the plurality of input channels can be identified directly from the multiplexed output signal.

According to a second embodiment there is provided a multiplexer device comprising: an input circuit configured to receive a plurality of input signals representing measurement values from a corresponding plurality of input channels; and a multiplexing circuit that is configured to alternately select between the plurality of input channels to thereby generate a multiplexed output signal, wherein the multiplexed output signal includes a sequence of values representing respective measurement values for one or more of the input channels from which input signals were provided to the multiplexer device, wherein when generating the multiplexed output signal the multiplexing circuit is configured to encode the measurement values for the plurality of input channels from which input signals were provided to the multiplexer device into the multiplexed output signal in such a manner that respective measurement values from different ones of the plurality of input channels can be identified directly from the multiplexed output signal.

As will be explained further below, the above arrangements may provide a more 'autonomous' multiplexer device. In particular, the multiplexer device described herein may be operated automatically and independently, e.g., and in an embodiment, without requiring external triggering or control of the input switching operation (as may be required in more conventional multiplexing operations to be able to identify which measurement values correspond to which input channels).

For instance, in embodiments of the above, the multiplexer device is operable to automatically and alternately select between the plurality of input channels to thereby generate a multiplexed output signal. That is, rather than requiring an external control to switch between the different channels, the multiplexer device can alternate between input channels under its own control (autonomously, e.g., such that the multiplexer device switches between different input channels without external control of the input switching operation). For example, the multiplexer device may be arranged to automatically switch between input channels, e.g., after a certain interval (which may be a fixed interval, but need not be). The multiplexer device may include an internal switching circuit that triggers such input switching. Various arrangements would be possible in that regard.

The output signal will thus include a sequence of values representing respective measurement values for one or more of, e.g., at least some of, e.g., all of, the input channels from which input signals were provided to the multiplexer device. Typically the output signal will include a sequence of values representing respective measurement values from multiple, e.g., all, of the input channels, but this need not necessarily be the case.

This however means that any external control unit that may need to process and use the measurement values may not know in advance which measurement value for which input channel is being included into the output signal at any instant in time. In the operation of the multiplexer device described herein, this information is therefore encoded into the multiplexed output signal itself such that the external control unit is able to identify directly from the output signal which input channel is currently being commuted with the output signal.

Thus, the multiplexer device described herein is able to encode measurement values from a plurality of input channels into a multiplexed output signal in such a manner that it can be identified directly from the multiplexed output signal which measurement values in the sequence of measurement values represented by the multiplexed output signal correspond to which of the plurality of input channels.

In this way the multiplexing operation can be effectively decoupled from the control unit hardware. This then means that the multiplexer device can be updated/re-configured appropriately, as desired, e.g., to accommodate further input channels, simply by changing the operation of the multiplexer device, and potentially also updating the overall control software, but without necessitating significant hardware changes to the multiplexer device or any other external components within the system in which the multiplexer device is to be used.

Two main approaches are contemplated for encoding the measurement values into the multiplexed output signal.

In a first main approach, the multiplexer device is arranged to include within the multiplexed output signal a set of one or more respective reference values for the different input channels. The respective reference values can then be used to identify the position of a measurement value from a particular input channel in the sequence of values represented by the multiplexed output signal. For example, in such embodiments, the output signal may be provided to a control unit. As will be explained further below, the control unit receiving the output signal can then identify which measurement is from a particular input channel based on a known association of a particular reference value with particular input channel and/or a predetermined sequence of the input channels.

Thus, in embodiments, the method comprises the multiplexer device alternating between different input channels interleaved with providing to the output signal the respective reference values for at least some of the input channels. The multiplexer device may thus be arranged to interleave respective reference values for the different input channels with the measurement values (input signals) from the different input channels, such that the multiplexed output signal contains an interleaved sequence of reference values and measurement values.

In this way the measurement values for the different input channels can be identified directly from the multiplexed output signal using the respective reference values.

For instance, in an embodiment of the above, the multiplexer device is configured to include a respective reference value for an input channel (and in embodiments for each of the input channels) into the multiplexed output signal immediately before the measurement value for the input channel in question. Thus, the multiplexed output signal may contain, in sequence: a first reference value for a first input channel, followed by a measurement value for the first input channel; a second reference value for a second input channel, the measurement value for the second input channel; and so on.

Where the reference values are included into the output signal immediately before the corresponding measurement values for the respective input channels, when a reference value is identified within the output signal, it can thereby be determined that the next value represented by the output signal will be the measurement value for that input channel. On this basis it can thus be identified using the reference values that are included into the output signal which input channel is being commuted with the output signal at any instant in time, directly from the output signal itself. Various other arrangements would be possible in this respect.

Thus, in embodiments of the above, the multiplexer device, when generating the multiplexed output signal, includes respective reference values for at least some of the input channels into the sequence of values represented by the multiplexed output signal such that a measurement value for a particular input channel can be identified using the respective reference value.

At least some of the reference values are different from one another to allow the different input channels to be distinguished. Each of the plurality of input channels may have its own, unique reference value. In that way it is possible to identify the measurement values from each of the input channels using the respective unique reference values. However, this need not be the case, and in some embodiments, only some (less than all) of the input channels have a unique reference value. For example, if two input channels are measuring the same, or a similar, property, e.g., for redundancy, the two input channels may in that case use the same reference value. For instance, in such cases, it may not be necessary to identify which measurement value is associated with which input channel, as the control system may only be interested in differences between the two input channels (rather than the absolute values). Thus, a reference value may identify a respective input channel or a respective set of plural input channels.

Typically the reference value for an input channel will be included immediately before the measurement value for that channel, as described above. However, other arrangements would also be possible.

There may be a discrete set of pre-defined reference values that are available for inclusion into the multiplexed output signal. The reference values may generally be selected to be outside the normal (expected) measurement ranges such that the reference values are clearly identifiable and distinguishable from the actual measurement values. For example, where the measurement values are temperatures, which might be expected to fall within a range 0 to 150 degrees Celsius (for instance), the reference values may correspondingly be selected in the range −200 to −250 degrees Celsius, well below any value that would actually be measured.

The multiplexed output signal including the interleaved reference values may thus be provided to an external control unit software that is then able to identify using the reference values the measurement values directly from the output signal. The pre-defined reference values may be provided to the external control unit software appropriately to allow the external control unit to identify the respective reference values. This may be done in any suitable and desired fashion. For example, the reference values could be hard-coded into the control unit software. Or, as another example, a look-up table may be provided (either logically internal or external to the control unit software) to allow the external control unit software to identify which reference value identifies which measurement channel. However, in general, the reference values may be provided to the control unit software by any suitable method.

In embodiments the input signals representing the measurement values may be included into the output signal in their raw format ('as is'). However, the input signals may also be subject to any suitable and desired processing as part of the multiplexing operation. Thus, the multiplexer device may generally be configured to process the input signals resenting the measurement values into a different format for inclusion into the output signal. Various arrangements would be possible in this regard.

In a second main approach, the multiplexer device is configured to convert the respective measurement values for the different input channels to a respective output range. For example, each input channel may be associated with a respective, unique output range that corresponds to a sub-range of the total output range for the multiplexer device, such that the input channel to which the measurement value corresponds can be determined directly based on the respective range (i.e. sub-range) in which the output value is located.

Thus, in embodiments of the above, the multiplexer device, when generating the multiplexed output signal, converts the input signals for different ones of the plurality of input channels to different respective output ranges such that the measurement values for the different input channels are associated with different output ranges within the multiplexed output signal. The measurement value from a given input channel may thus be expected to always fall within its respective output range, and can thus be identified in this way, directly from the output signal itself. In such embodiments, the receiver of the output signal may include a control unit which can identify which measurement is from a particular input channel based on a known association of a particular output signal range with particular input channel and/or a predetermined sequence of the input channels.

The multiplexer device may thus include suitable processing circuitry (which may, e.g., comprise a microprocessor or analogue circuit) that is operable to convert the signals received at the multiplexer device to a respective output range for the corresponding input channel from which the signal was provided. This may be done, for instance, by applying a suitable scaling function to the input signal. The scaling function may be selected appropriately, e.g., such that each input channel has its own scaling function, e.g., that may be defined according to the expected range of measurement values associated with the input channel. The set of scaling functions (or, more particularly, an inverse set of scaling functions) can then also be (separately) provided to the external control unit to allow the external control unit to determine the original measured values. Thus, after the external control unit has suitably decoded the output signal to determine which of the input channels a particular measurement value has come from, the external control unit can then further process the output signal to determine the original measured value from that input channel, e.g., by applying the appropriate inverse scaling function.

The scaling functions may be pre-defined appropriately, e.g., depending on the expected measurement range for the input channel in question. For example, based on the expected measurement range for a given input channel, a suitable scaling function can then be determined that will scale the measurement values into the desired (unique) reference output range (i.e., sub-range) for that input channel. Various arrangements would be possible in this regard.

In this case, if an input value is outside of the expected measurement range for its input channel, e.g., due to sensor malfunction or failure, the scaling function may then result in an output value outside of the desired reference output range. That might cause the abnormal value to be incorrectly determined as coming from a different input channel. To avoid this, the result of the scaling function may in some cases be 'truncated' such that the output value for each input channel is always forced to fall within the desired reference output range.

In this way the input channel being commuted into the output signal can be identified directly from the output signal at any instant in time based on which input channel corresponds to the output range in which the output value is located. Therefore, the measurement values for the different channels can be identified directly from the output signal itself without requiring the external control unit to control the multiplexing operation.

It will be appreciated that the two approaches described above are not exclusive and in embodiments the multiplexer device may be arranged to perform a combination of these approaches. For example, the multiplexer device may be arranged to interleave reference values for at least some input channels whilst also converting the signals to respective output ranges for at least some input channels. Various arrangements would be possible in that regard.

As mentioned above, the multiplexer device is in an embodiment configured to autonomously and automatically, e.g., without requiring external control, alternately select between the plurality of input channels, to thereby generate a multiplexed output signal. For example, the multiplexer device may first commute a first input channel with the output channel, such that, at a first time, the output signal represents the signal from the first input channel. After commuting the first input channel with the output channel for a first time period, the multiplexer device may then switch to a second input channel, and then (optionally after inserting an appropriate reference value, when that approach is being used) commute the input signal from the second input channel with the output channel, for a second time period, and so on.

In embodiments, the multiplexer device is configured to alternate between the plurality of input channels in sequence, e.g., such that multiplex device alternates between the different input channels according to a predetermined sequence. Thus, the multiplexer device may cycle between the input channels in the same order. This cycle may be repeated continuously during operation of the system or it may be performed for a limited number of iterations (e.g., only for a set of one or more cycles upon start-up of the device). However, this need not necessarily be the case, and the multiplexer device could be arranged to change the order between different measurement cycles, and in that case the measurement values can still be identified using the techniques described above.

In embodiments where the multiplexing device does commute between the input channels in a predetermined fashion, the control unit receiving the output value may be configured to expect measurements within specified output ranges at given times based on the predetermined sequence. In this case, the control unit may be configured to discard any received measurements that fall outside of the expected output range for that point within the sequence. Alternatively, such abnormal values may prompt the control unit to switch to an abnormal handling mode. This can therefore provide another fail-safe. That is, although the control unit does not which input channel will be commuted at any particular instant in time, it may have knowledge of the expected sequence, and can use this to discard abnormal measurements.

As mentioned above, in embodiments, the multiplexed output signal is then provided to a control unit that is external to, and independent of, the multiplexer device. The control unit can thus read out the output signal, and then process the output signal as necessary to obtain the desired measurement values. The control unit can then process and use the measurement values appropriately. For example, in response to obtaining and processing the measurement value from a respective input channel, the control unit may then issue a control signal, an alert, etc., depending on the system for which the control unit is provided.

The control unit may be arranged to continuously read out the multiplexed output signal. However, in typical embodiments, the control unit will periodically sample the multiplexed output signal, at discrete intervals. The control unit may be arranged to sample the multiplexed output signal at discrete intervals with the sampling interval selected such that the control unit at least attempts to read out one value per multiplexer switching cycle (one read out for each measurement (or reference) value). In that case each read out value may correspond to a different measurement (or reference) value.

The control unit may not know the multiplexer switching cycle and so attempting to read out (only) one value per multiplexer switching cycle may require additional communication or monitoring of changes in the output signal. Accordingly, in other embodiments the control unit may be arranged to sample the multiplexed output signal with a shorter sampling interval, e.g., such that the control unit may be caused to sample the multiplexed output signal multiple times per multiplexer switching cycle such that multiple read outs are performed for the same measurement value. In that case the read out values should all be substantially the same, or at least within the tolerance level of the sensor and/or read-out circuit (since they are reading the same measurement value). This therefore also provides additional redundancy. For example, if the read out values for a particular measurement value differ from one another (e.g., by more than a threshold amount) this indicates that the read out may be improper or ambiguous, in which case the read out values may be rejected and the measurement value should be re-sampled, e.g., in the next multiplexing cycle.

Whilst embodiments are described above in relation to an output signal it will be appreciated that the multiplexer device may have a plurality of output channels which may each have a respective output signal. At least one of the output signals is generated in the multiplexed manner described herein. The other output signals may either be generated in a multiplexed manner or not.

The input channels may each correspond to a respective sensor. The input signals that are provided to the multiplexer device may thus represent measurement signals provided by the respective sensor associated with the input channel in question. Correspondingly, the measurement values may represent measurements obtained from a respective sensor. Thus, each input channel may correspond to a respective measurement value from a respective sensor.

The present disclosure can be applied to any suitable and desired measurement values. For example, whilst in some embodiments described in detail below the measurement values include temperature values, the present disclosure can generally be applied to any suitable values that may desirably be processed in the multiplexed manner described herein.

Another aspect of the present disclosure relates to a measurement system including a multiplexer device as described above. The measurement system may comprise a plurality of sensors connected to the plurality of input channels of the multiplexer device and a control unit that is operable to read out the multiplexed output signal and to process/use the measurement values accordingly.

The measurement system may be used for measuring conditions within any suitable apparatus. In embodiments the measurement system is used for measuring conditions within an apparatus that is installed within an aircraft. For instance, the apparatus may comprise a galley insert, such as an oven, a water heater, a beverage chiller, a coffee machine, etc. For example, in an embodiment, the measurement system is provided as part of an oven control unit, and is arranged to measure at least one of: the air temperature in the oven, a temperature of the oven's heating element, the oven fan speed. Other arrangements would of course be possible.

The various functions of the technology described herein can be carried out in any desired and suitable manner. For example, the multiplexer device can be implemented in hardware or software, as desired. Thus, for example, unless otherwise indicated, the various functional elements of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) such as electrical/electromechanical circuits and/or programmable hardware elements (processing circuits) that can be programmed to operate in the desired manner.

BRIEF DESCRIPTION OF THE DRAWINGS

Embodiments will now be described, by way of example only, with reference to the drawings.

DETAILED DESCRIPTION

Various specific embodiments will now be described by way of example in relation to an oven measurement system, in particular of the type that may be used for a galley insert oven, on board an aircraft. However, it will be appreciated that the present disclosure is not limited to this application and that the techniques described herein may be applied to any suitable measurement system, as desired.

First, by way of background, a more conventional oven measurement system 10 will be described with reference to FIG. 1.

Figure 1:
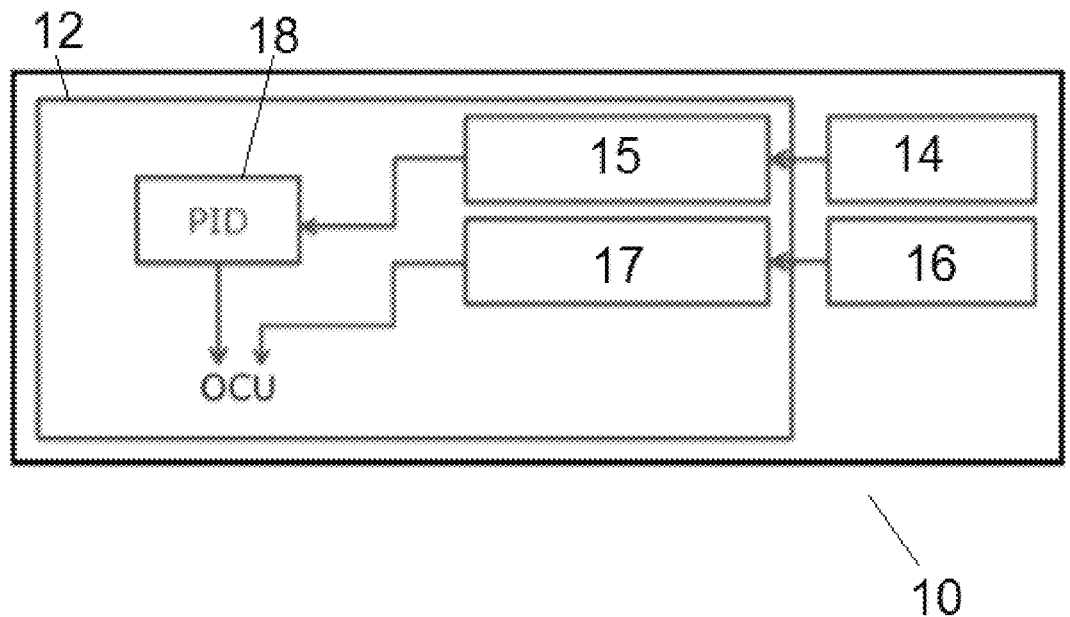
FIG. 1 is a block diagram showing a more conventional measurement system.

In particular, FIG. 1 shows an oven measurement system 10 including a typical oven control unit 12 having two temperature measuring channels able to transduce signals from respective temperature sensors 14, 16. The temperature sensors may, for example, comprise thermistors such as PT100/PT1000 sensors. However, it will be appreciated that any other suitable temperature or other sensors may be used as appropriate according to the present disclosure, e.g., depending on the measurement values that are being monitored, e.g., depending on the system in question. Likewise, whilst FIG. 1 shows a control unit 12 having two temperature measuring channels it will be appreciated that the control unit may in embodiments of the present disclosure have any number of measuring channels, as desired.

In FIG. 1, the oven control unit 12 has a separate, dedicated temperature measuring channel and sensor circuit 15, 17 for each temperature sensor 14, 16. Connecting additional sensor(s) would therefore require implementing additional sensor circuits in the oven control unit, thus requiring significant hardware modification.

In addition, in this example, the first temperature measuring channel and sensor circuit 15 is part of a safety loop (which in this example comprises a proportional-integral-derivative (PID) feedback controller 18) and therefore should not be modified in any way.

The present embodiment provides a way to allow to measure multiple values of certain physical quantities, using a single hardware measurement channel/circuit. In particular, this is done by using an autonomously switching multiplexer and encoding into the multiplexed output signal information that allows the oven control unit 12 to identify which input channel is being commuted with the output as any particular instant in time. This then allows additional sensors to be incorporated into the measurement system using the existing measuring hardware channel, without modifying the hardware of the oven control unit 12 itself.

Figure 2:
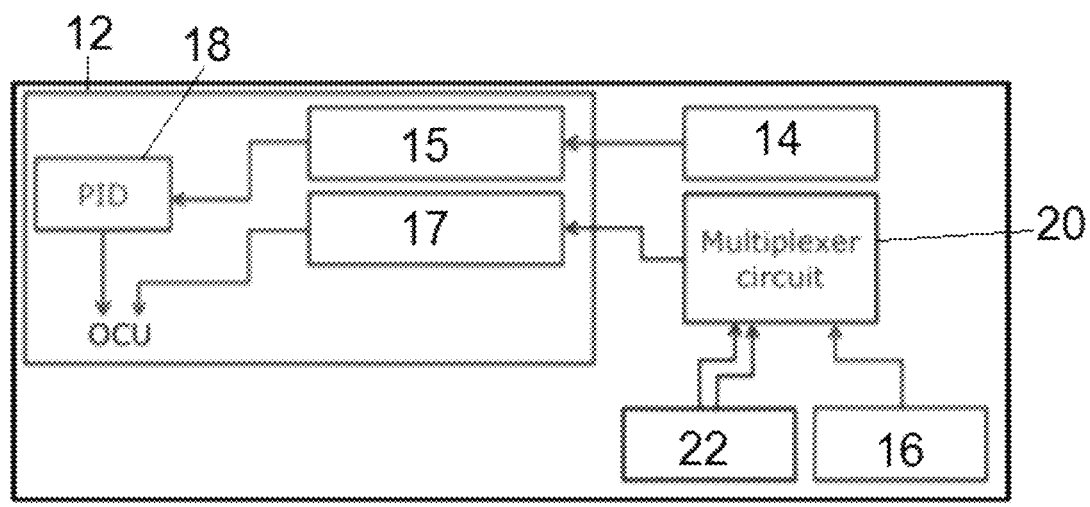
FIG. 2 is a block diagram showing a measurement system according to an embodiment.

FIG. 2 shows an example according to an embodiment. In this example the first temperature sensor 14 and sensor circuit 15 that form part of the safety loop (PID) 18 are unmodified. The second sensor circuit 17 within the oven control unit 12 is also unmodified. Thus, the oven control unit 12 hardware is itself unmodified. However, rather than providing the signal from the second sensor 16 directly to the second sensor circuit 17, the measurement signal from the second sensor 16 is provided together with respective measurement signals from a plurality of sensors 22 to a multiplexer 20 that is operable to generate a single multiplexed output signal that is then provided to the second sensor circuit 17 of the oven control unit 12 for processing.

While FIG. 2 shows a single multiplexed output signal, it will be understood that multiplexer 20 may be operable to produce multiple output signals. In that case, the techniques described herein may also be used to identify which input channel(s) is/are being commuted with which of the outputs. Typically, to achieve the benefit of the multiplexing operation, the number of output signals should be less than the total number of input channels. However, in general, the multiplexer 20 may be operated to produce any suitable and desired number of output signals from the available input channels.

It will be understood that 'multiplexing' is a method by which multiple input signals can be commuted over a shared output channel. Thus, the multiplexer 20 generally includes a plurality of input channels that are each capable of receiving a respective input signal and at least one output channel that provides the multiplexed output signal. The multiplexer 20 also contains suitable processing circuitry for combining (and encoding) the input signals appropriately into a single multiplexed output signal, e.g., in the manner described below.

The multiplexer 20 in the present embodiment is thus configured to commute one of the input channels (i.e. the input from temperature sensor 16 or any of the inputs from sensors 22) with a single output that is connected to the temperature measuring channel 17 in the oven control unit 12. Switching between input channels is performed in a sequential way and in the present embodiment is driven by the multiplexer 20 itself, e.g., without external triggering or control from the oven control unit 12. For example, the multiplexer 20 may be arranged to switch between input channels in a predetermined fashion, e.g., with a constant switching interval. Alternatively, the multiplexer 20 may switch between input channels at random intervals or at intervals with a selected variability. For example, some input channels may be commuted for longer intervals.

Because the multiplexer 20 in the present embodiment switches under its own control (rather than switching on request from the oven control unit 12) this means that the oven control unit 12 may not know at any instant in time which of the input channels is being commuted with the output.

Accordingly, in the present embodiment, the multiplexer 20 is arranged to encode the measurement values from the plurality of input channels into the multiplexed output signal in such a manner to allow the oven control unit 12 to directly determine from the multiplexed output signal which of the input channels is being commuted with the output at a given moment in time.

Figure 3:
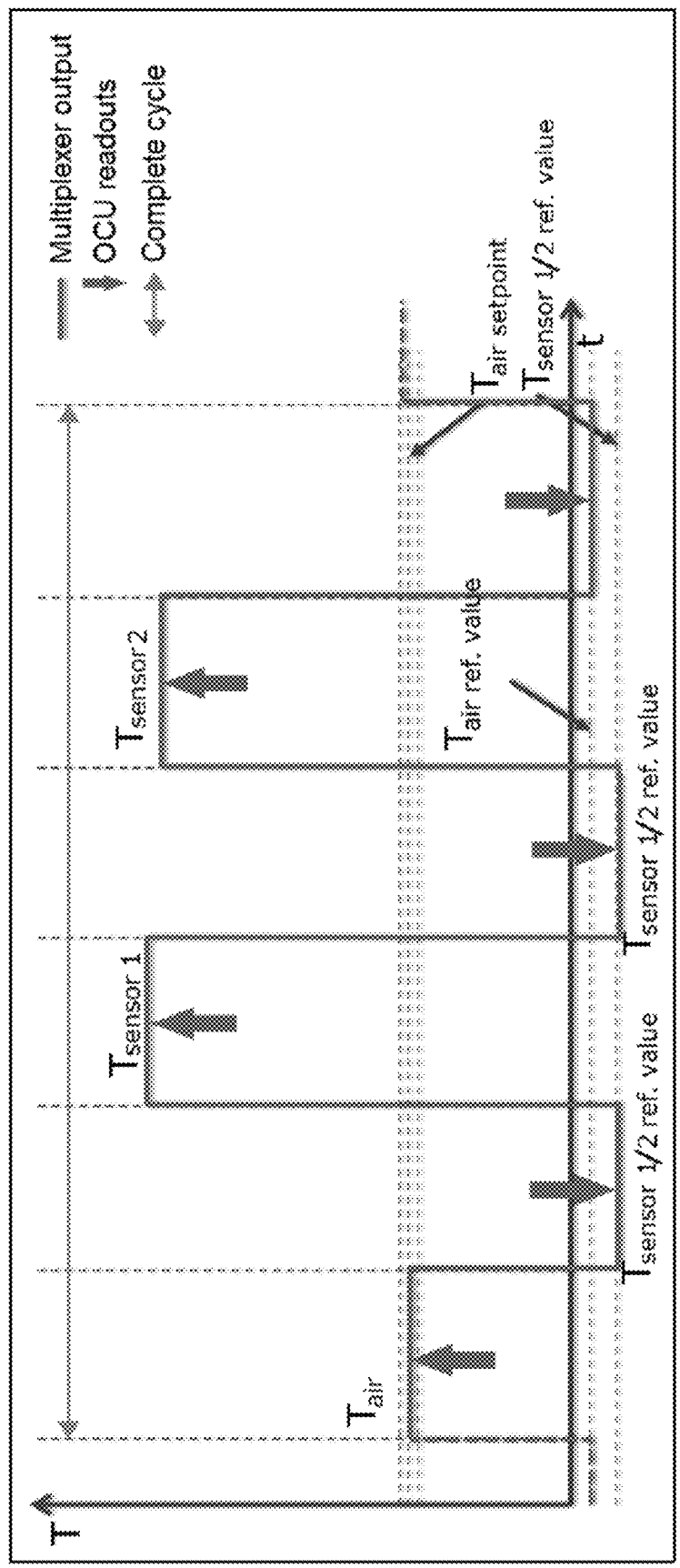
FIG. 3 illustrates a first approach for a multiplexing scheme according to an embodiment.

FIG. 3 shows a first approach for doing this. As shown in FIG. 3, the measurement values from the different input channels are each associated with a respective reference value, with the respective reference values for the different input channels being interleaved into the multiplexed output signal appropriately.

In particular, in the example shown in FIG. 3, there are three input channels corresponding to three different temperature measurements from three different temperature sensors. In this example one of the measurements corresponds to a measurement of the air within the oven (Tair) whereas the other two measurements correspond to (redundant) measurements of the (e.g.) oven air temperature of the (Tsensor1, Tsensor2). However, it will be appreciated that this is merely an example and any suitable measurement values may be used and processed in the manner described herein.

The multiplexer 20 is thus arranged to insert into the multiplexed output signal, immediately before each of the measurement values, a corresponding reference value that allows the input channel to which the measurement value relates to be identified. The reference values may be generated in any suitable and desired fashion. For example, the reference values may be generated internally to the multiplexer 20, e.g., by a suitable reference generating circuit, or reference generating software, of the multiplexer 20. Or, the reference values may be generated externally by a circuit connected to an input of the multiplexer 20 with the reference input(s) then being commuted appropriately into the output signal to interleave the reference values with the corresponding measurement values. Various arrangements would be possible in this regard.

As shown in FIG. 3, the reference values are carefully chosen from range that is far from resistance values corresponding to typical operational temperatures, i.e. out of range of (−200 to +1000° C.). The output signal can thus be read and it can be determined directly from the output signal itself which measurement value is being provided at any instant in time by checking which reference value immediately preceded the measurement value in the sequence of values represented by the output signal. For example, the measurement value Tair can be identified using its respective reference value (Tair ref value). Correspondingly, the measurement values Tsensor1, Tsensor2 can be identified using their respective reference value (Tsensor1/2 ref value) which in this example is shared for both respective input channels. Each reference value may be single value or may represent a range of values. For example, the reference values for each measurement value may vary within the tolerance of the electrical circuit, or alternatively each reference value may vary with a selected variability.

As shown in FIG. 3, the multiplexer 20 is arranged to automatically cycle through the input channels such that each measurement value is commuted with the output signal during a complete cycle of the multiplexing operation. The sequence of reference and measurement values is thus repeated during operation. The oven control unit 12 can then read out the measurement values by sampling the output signal at appropriate intervals. The OCU readout arrows of FIG. 3 show example sampling points for the output signal.

For instance, the oven control unit 12 can get information from any temperature sensor connected to multiplexer by sampling channel multiple times to spot first proper reference value corresponding to desired input channel/sensor, then waiting for value change, to finally measure desired value.

Figure 4:
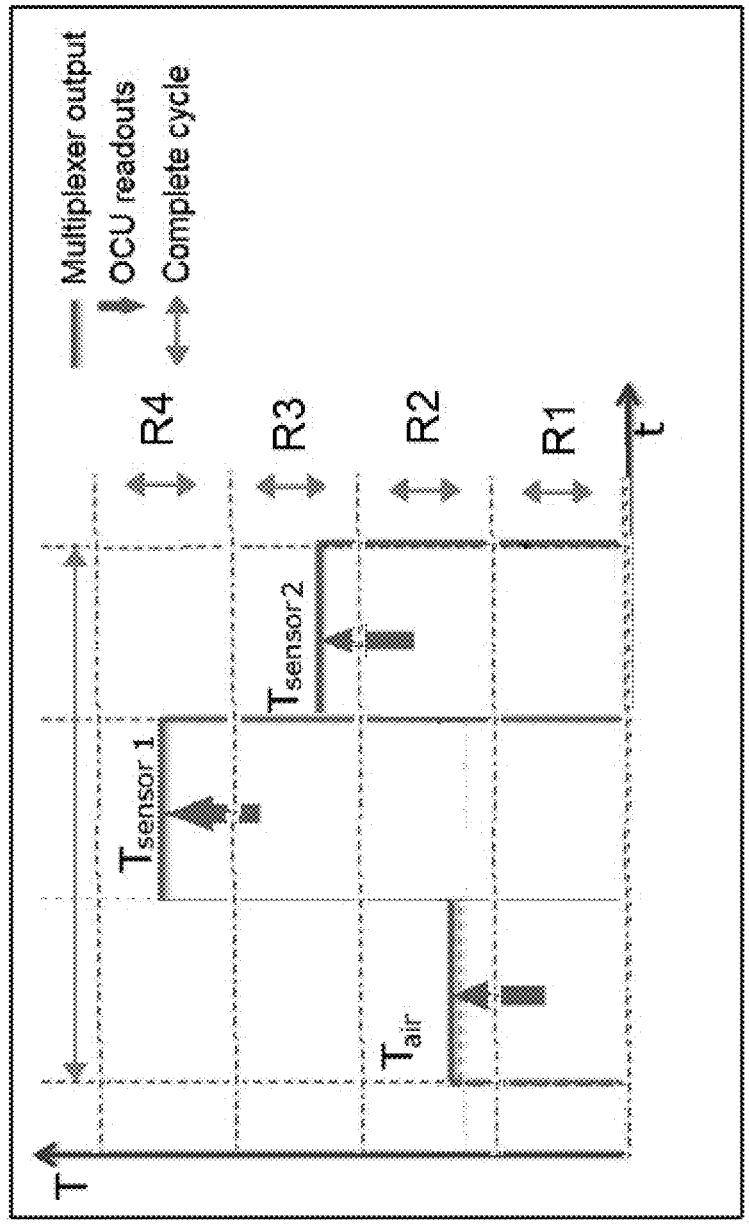
FIG. 4 illustrates a second approach for a multiplexing scheme according to another embodiment.

FIG. 4 shows a second approach for encoding this information into the multiplexed output signal. In FIG. 4, each of the measurement values from the respective input channels is scaled to a respective, unique output range R1 . . . R4. Again, in this way, the oven control unit 12 can read out the measurement values by sampling the output signal at appropriate intervals and can identify which measurement value comes from which sensor according to the respective output range. The oven control unit 12 can then apply a suitable inverse scaling function to the output signal to determine the actual measurement values.

Various combinations of these approaches are also contemplated.

Figure 5:
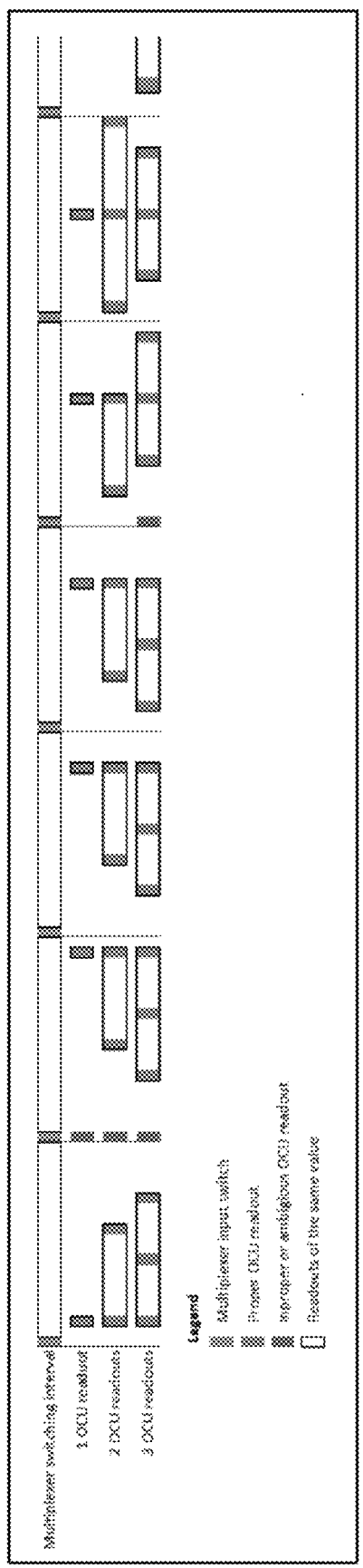
FIG. 5 illustrates various read out schemes according to embodiments.

FIG. 5 illustrates various examples of the read out process. In particular, FIG. 5 shows how the oven control unit 12 can be arranged to perform different numbers of read outs during a switching interval (between different input channels). In particular, in FIG. 5, it will be appreciated that the sampling (read out) frequency does not exactly match the multiplexer switching frequency (which is to be expected since the multiplexing operation is independent of the oven control unit 12).

In the first example the oven control unit 12 is arranged to attempt to perform one read out per switching interval. In this case the second read out happens to coincide with the actual switching of input channels and so this read out is ambiguous (and should be rejected).

For redundancy it may be desirable that the oven control unit 12 is arranged to attempt to perform more than one read out per switching interval. Thus, the second example shows a scheme where the sampling frequency is set to attempt to perform two read outs per switching interval. The third example shows a scheme where the sampling frequency is set to attempt to perform three read outs per switching interval. In those cases all of the read outs within a single switching interval should give the same measurement value (and if this is not the case the measurement may be rejected).

Thus, the present embodiment provides a way to allow to measure multiple values of certain physical quantities, using single hardware channel, utilizing an autonomously switching multiplexer that is able to encode measurement values from different input channels into the multiplexed output signal in such a manner that it can be determined directly from the output signal which one of the input channels is being output at any instant in time.

The use of the multiplexer device may thus allow to extend temperature measurements capabilities of an oven control unit to multiple (additional) sensors without significant hardware modification, but only by modifying the oven control unit software and some of the wirings. This can therefore simplify the updating process, and in aircraft applications may therefore reduce the time to market.

The multiplexer system may thus be particularly beneficial in the context of an aircraft system. However, it will be appreciated that the multiplexer operation described above may find application in, and provide advantages in many fields where measurements are to be obtained from a plurality of sensors.

The multiplexer itself may be realised in any suitable fashion. For example, the multiplexer may be realised in hardware using suitable electrical or electromechanical components that are operable to switch between input signals in the desired manner. Alternatively/additionally, the multiplexer may be realised at least in part in software. For example, the multiplexer may include a suitable microprocessor that is operable to combine the respective input signals appropriately. Various arrangements would be possible in this regard and the present embodiment is not intended to be limited in this way.

Thus, although the techniques presented herein have been described with reference to particular embodiments, it will be understood by those skilled in the art that various changes in form and detail may be made without departing from the scope of the invention as set forth in the accompanying claims.

The invention claimed is:

1. A method of obtaining measurement values from a plurality of input channels, the method comprising:
receiving, at a multiplexer device, a plurality of input signals representing respective measurement values from a corresponding plurality of input channels; and
the multiplexer device processing the input signals to generate a multiplexed output signal, wherein the multiplexed output signal includes a sequence of values representing respective measurement values for one or more of the input channels from which input signals were provided to the multiplexer device, wherein the multiplexer device when generating the multiplexed output signal encodes the measurement values for the plurality of input channels from which input signals were provided to the multiplexer device in such a manner that respective measurement values from different ones of the plurality of input channels can be identified directly from the multiplexed output signal, such that it can be identified directly from the multiplexed output signal, for a particular one of the values in the sequence of values included in the multiplexed output signal representing respective measurement values for one or more of the input channels from which input signals were provided to the multiplexer device, which of the plurality of input channels the particular one of the values in the sequence of values that is included in the multiplexed output signal represents a respective measurement value for.

2. The method of claim 1, wherein processing includes the multiplexer device alternating between different input channels according to a predetermined sequence.

3. The method of claim 1, wherein processing includes the multiplexer device autonomously switching between different input channels such that the multiplexer device switches between different input channels without external control of the input switching operation.

4. The method of claim 1, wherein multiplexer device, when generating the multiplexed output signal, includes respective reference values for at least some of the input channels into the sequence of values represented by the multiplexed output signal such that a measurement value for a particular input channel can be identified using the respective reference value.

5. The method of claim 1, wherein generating the multiplexed output signal comprises: converting the input signals for each of the plurality of input channels to different respective output ranges such that the measurement values for the each of the different input channels are associated with a different output range within the multiplexed output signal.

6. The method of claim 1, wherein the multiplexer device alternates between the different input channels with non-constant time intervals, optionally wherein the non-constant time intervals are random time intervals.

7. The method of claim 1, wherein the measurement values are provided from a plurality of sensors, each sensor connected to a corresponding one of the input channels of the multiplexer device.

8. The method of claim 1, further comprising:
reading out the multiplexed output signal from the multiplexer device and determining from the multiplexed output signal measurement value for at least one of the input channels.

9. A multiplexer device comprising:
an input circuit configured to receive a plurality of input signals representing measurement values from a corresponding plurality of input channels; and
a multiplexing circuit that is configured to alternately select between the plurality of input channels to thereby generate a multiplexed output signal, wherein the multiplexed output signal includes a sequence of values representing respective measurement values for one or more of the input channels from which input signals were provided to the multiplexer device,
wherein when generating the multiplexed output signal the multiplexing circuit is configured to encode the measurement values for the plurality of input channels from which input signals were provided to the multiplexer device into the multiplexed output signal in such a manner that respective measurement values from different ones of the plurality of input channels can be identified directly from the multiplexed output signal,
such that it can be identified directly from the multiplexed output signal, for a particular one of the values in the sequence of values included in the multiplexed output signal representing respective measurement values for one or more of the input channels from which input signals were provided to the multiplexer device, which of the plurality of input channels the particular one of the values in the sequence of values that is included in the multiplexed output signal represents a respective measurement value for.

10. The device of claim 9, wherein the device is configured to autonomously alternate between the different input channels according to a predetermined sequence.

11. The device of claim 9, wherein the multiplexing circuit is configured to, when generating the multiplexed output signal, include respective reference values for at least some of the input channels into the sequence of values represented by the multiplexed output signal such that a measurement value for a particular input channel can be identified using the respective reference value.

12. The device of claim 11, wherein the respective reference values are generated by the multiplexing circuit.

13. The device of claim 9, wherein the multiplexing circuit is configured to, when generating the multiplexed output signal: convert the input signals for different ones of the plurality of input channels to different respective output ranges such that the measurement values for the different input channels are associated with different output ranges within the multiplexed output signal.

14. A measurement system comprising:
a multiplexing device comprising:
an input circuit configured to receive a plurality of input signals representing measurement values from a corresponding plurality of input channels; and
a multiplexing circuit that is configured to alternately select between the plurality of input channels to thereby generate a multiplexed output signal, wherein the multiplexed output signal includes a sequence of values representing respective measurement values for one or more of the input channels from which input signals were provided to the multiplexer device,
wherein when generating the multiplexed output signal the multiplexing circuit is configured to encode the measurement values for the plurality of input channels from which input signals were provided to the multiplexer device into the multiplexed output signal in such a manner that respective measurement values from different ones of the plurality of input channels can be identified directly from the multiplexed output signal,
such that it can be identified directly from the multiplexed output signal, for a particular one of the values in the sequence of values included in the multiplexed output signal representing respective measurement values for one or more of the input channels from which input signals were provided to the multiplexer device, which of the plurality of input channels the particular one of the values in the sequence of values that is included in the multiplexed output signal represents a respective measurement value for; and a control unit that is external to the multiplexer device and that is operable to read out the multiplexed output signal from the multiplexer device and to determine directly from the multiplexed output signal the measurement values for the plurality of different input channels.

15. The measurement system of claim 14, further comprising:

a plurality of sensors, each sensor connected to a corresponding one of the input channels of the multiplexer device.

16. The measurement system of claim 14, wherein the multiplexer device is configured to autonomously switch between different input channels such that the alternate selection between the different input channels is performed without external control by the control unit.

17. The measurement system of claim 14, wherein the multiplexer device is configured to, when generating the multiplexed output signal, include respective reference values for at least some of the input channels into the sequence of values represented by the multiplexed output signal such that a measurement value for a particular input channel can be identified using the respective reference value.

18. The measurement system of claim 17, wherein the respective reference values are generated by the multiplexing circuit.

19. The device of claim 14, wherein the multiplexing circuit is configured to, when generating the multiplexed output signal: convert the input signals for different ones of the plurality of input channels to different respective output ranges such that the measurement values for the different input channels are associated with different output ranges within the multiplexed output signal.

20. The measurement system of claim 14, wherein the measurement system is used for measuring conditions within an apparatus that is installed within an aircraft.

* * * * *